United States Patent
Ishizaki et al.

(10) Patent No.: US 8,330,085 B2
(45) Date of Patent: Dec. 11, 2012

(54) SPREAD-SPECTRUM HIGH-FREQUENCY HEATING DEVICE

(75) Inventors: Toshio Ishizaki, Hyogo (JP); Toshiyuki Okajima, Shiga (JP); Kazuhiro Yahata, Osaka (JP); Takashi Uno, Hyogo (JP)

(73) Assignee: Panasonic Corporation, Osaka (JP)

( * ) Notice: Subject to any disclaimer, the term of this patent is extended or adjusted under 35 U.S.C. 154(b) by 430 days.

(21) Appl. No.: 12/745,825

(22) PCT Filed: May 8, 2009

(86) PCT No.: PCT/JP2009/002024
§ 371 (c)(1),
(2), (4) Date: Jun. 2, 2010

(87) PCT Pub. No.: WO2009/139136
PCT Pub. Date: Nov. 19, 2009

(65) Prior Publication Data
US 2010/0243645 A1    Sep. 30, 2010

(30) Foreign Application Priority Data
May 13, 2008    (JP) .................................. 2008-125461

(51) Int. Cl.
*H05B 6/68*    (2006.01)
(52) U.S. Cl. ........................................ 219/702; 219/715
(58) Field of Classification Search ................... 219/702, 219/715
See application file for complete search history.

(56) References Cited

U.S. PATENT DOCUMENTS
2009/0212046 A1 *   8/2009 Tabuse ........................ 219/702
2010/0176121 A1 *   7/2010 Nobue et al. .................. 219/716

FOREIGN PATENT DOCUMENTS

| EP | 2 040 513 A2 | 3/2009 |
| EP | 2 051 564 A1 | 4/2009 |
| JP | 56-96487 | 8/1981 |
| JP | 59-165399 | 9/1984 |
| JP | 2000-357583 | 12/2000 |
| JP | 2002246167 A * | 8/2002 |
| JP | 2007-317458 | 12/2007 |
| JP | 2008-034244 | 2/2008 |
| WO | 2008/007777 A2 | 1/2008 |
| WO | 2008/018466 A1 | 2/2008 |

OTHER PUBLICATIONS

International Search Report for corresponding International Application No. PCT/JP2009/002024 mailed Aug. 11, 2009.
PCT/ISA/237 and a partial English translation for International Application No. PCT/JP2009/002024 dated Aug. 11, 2009.

* cited by examiner

Primary Examiner — Tom Thomas
Assistant Examiner — Christopher M Roland
(74) Attorney, Agent, or Firm — Renner, Otto, Boisselle & Sklar, LLP

(57) ABSTRACT

A variable-frequency oscillator 1, a semiconductor power amplifier 2 for amplifying the output of the variable-frequency oscillator 1; a radiator 3 for radiating an electromagnetic wave for heating based on the output of the semiconductor power amplifier 2; a reflected wave monitoring circuit 5 for detecting a reflected wave of the electromagnetic wave for heating; and a controller 7 for controlling the oscillation frequency of the variable-frequency oscillator 1 are provided. The controller 7 changes the oscillation frequencies of the variable-frequency oscillator 1 discontinuously, thereby getting a frequency-hopping spread-spectrum radiation done by the radiator 3. The electromagnetic wave radiated by the radiator 3 irradiates an object 9 to be heated (which is usually food) inside a heating chamber 8, thereby heating the object.

13 Claims, 9 Drawing Sheets

(a)

(b)

(c)

(d)

SPREAD-SPECTRUM HIGH-FREQUENCY HEATING DEVICE

TECHNICAL FIELD

The resent invention relates to an RF heating system for use in a microwave oven, for example.

BACKGROUND ART

A conventional RF heating system for use in a microwave oven includes a high power direct oscillator device called "magnetron", which uses a vacuum tube, and an antenna (or radiator) for radiating the electromagnetic wave that is generated by the magnetron inside the heating chamber. The frequencies of electromagnetic waves for such RF heating usually fall within an ISM band, and the oscillation frequency of the magnetron is ordinarily defined to be a predetermined value falling within the range of 2.40 GHz through 2.50 GHz. Actually, however, the oscillation frequency of the magnetron will fluctuate according to the voltage applied to the magnetron and the impedance inside the heating chamber. As a result, the spectrum of its oscillation will eventually cover almost the entire 100 MHz range from 2.40 GHz through 2.50 GHz.

To overcome such a problem, a solid-state RF heating system, including an oscillator and a solid-state power amplifier in place of a magnetron, has been researched and developed. Such a system is now proposed because an RF semiconductor device of GaN or SiC (which will be referred to herein as a "semiconductor power amplifier") has become more and more popular these days. An RF heating system that uses such a semiconductor power amplifier receives an RF signal, supplied from an oscillator, amplified by the semiconductor power amplifier and has the electromagnetic waves radiated from a radiator into the heating chamber with a lot of power.

A solid-state RF heating system can radiate electromagnetic waves with a line spectrum and with almost no noise components. In addition, by adjusting the settings of its oscillator, the radiation frequency of the line spectrum can be varied arbitrarily within the range of 2.40 GHz to 2.50 GHz.

However, a semiconductor power amplifier would be easily damaged under the heat when exposed to an intense reflected wave, which is a serious problem that must be solved to actually use it in that field of applications. If such a semiconductor power amplifier is used in the field of telecommunications, electromagnetic waves are radiated into a free space, and therefore, there is little need to keep the semiconductor power amplifier from getting damaged by reflected waves. On the other hand, if such a semiconductor power amplifier is used in a closed environment where intense electromagnetic waves are radiated into the heating chamber of a microwave oven, for example, strong reflected waves are easily produced inside the heating chamber. For that reason, the semiconductor power amplifier must be shielded from such reflected waves in one way or another.

Patent Document No. 1 discloses an example of an RF heating system with such a semiconductor power amplifier. As shown in FIGS. 9(a) and 9(c), such an RF heating system performs a monitor mode operation for measuring the intensity of a reflected wave with the intensity of a radiated wave (i.e., radiation power) kept low and with the frequency sweeping continuously right after the system has been turned ON. In the example illustrated in FIG. 9(c), the frequency is continuously varied in the monitor mode from 2.40 GHz through 2.50 GHz. When the intensity of the reflected wave produced in such a situation is sensed, it can be seen that the intensity of the reflected wave varies significantly according to the frequency of the electromagnetic wave as shown in FIG. 9(b).

By performing such a monitor mode operation, a frequency that will lead to the lowest reflected wave intensity can be determined. After the oscillation frequency has been fixed at such a frequency that has been determined in this manner, the output (i.e., the radiated wave) is raised as shown in FIG. 9(a), thereby starting radiation for the purpose of heating. In the system disclosed in Patent Document No. 1, if the intensity of the reflected wave becomes equal to or higher than a predetermined value for some reason during the heating process, the output (i.e., the electromagnetic waves radiated) is decreased and the heating process is stopped in order to prevent the solid-state amplifier from getting damaged by the reflected wave.

Such a solid-state RF heating system not only can perform an RF heating process at such a frequency at which the radiated waves are hardly reflected and the object can be heated with high absorption efficiency but also can keep the power amplifier from getting damaged by the reflected waves.

On the other hand, Patent Document No. 2 discloses an RF heating system that detects impedance in the heating chamber and controls the oscillation frequency based on the result of the detection. By adjusting the oscillation frequency, the system tries to get impedance matching always done and get the object cooked evenly.

Meanwhile, Patent Document No. 3 discloses a microwave processor that memorizes the relation between the reflection power and the frequency by making the microwave frequency sweep in the range of 2.4 MHz through 2.5 MHz and by detecting the reflected current. Such a microwave processor extracts a frequency that will lead to the lowest reflection power as a heating frequency by reference to the memorized relation between the reflection power and the frequency.

CITATION LIST

Patent Literature

Patent Document No. 1: Japanese Patent Application Laid-Open Publication No. 2007-317458
Patent Document No. 2: Japanese Patent Application Laid-Open Publication No. 59-165399
Patent Document No. 3: Japanese Patent Application Laid-Open Publication No. 2008-34244

SUMMARY OF INVENTION

Technical Problem

The RF heating system disclosed in Patent Document No. 1 needs to perform a preliminary monitor mode for measuring the reflected wave intensity with the frequency of the electromagnetic waves, which are radiated with low power, sweeping continuously. Also, if the object being heated in the heating chamber changed its condition during the heating process, then the frequency control could not keep up with the change, thus resulting in poor heating efficiency. On top of that, if the intensity of the reflected wave increased to reach a certain value, the heating process should be stopped to keep the semiconductor power amplifier from getting damaged, which is also a problem. Added to that, as the radiation frequency is fixed during the heating process, the distribution of the electromagnetic field will become steadily non-uniform inside the heating chamber, thus getting the object heated unevenly, which is another problem with that system.

Furthermore, according to the conventional technique disclosed in Patent Document No. 1, if a number of radiation units, each including a power amplifier and a radiator, are provided for a single RF heating system, then those radiation units will radiate electromagnetic waves at the common frequency that has been determined in the monitor mode. That is why the reflected wave of the electromagnetic wave radiated from one radiation unit cannot be distinguished from the electromagnetic wave radiated from another radiation unit. As a result, a significant error could sometimes be caused in the monitored intensity of the reflected wave.

Patent Document No. 2 does disclose an RF heating system that controls the oscillation frequency based on the impedance detected during the heating process but is silent about how to determine the best impedance. The system disclosed in Patent Document No. 2 seems to detect such a frequency that will get the impedance matching done while making the oscillation frequency sweep. If that is the case, however, Patent Document No. 2 will have the same problem as what has already been described for Patent Document No. 1.

Likewise, the microwave processor disclosed in Patent Document No. 3 also needs to make the frequency sweep, and therefore, will cause a similar problem to what has already been described about Patent Documents Nos. 1 and 2.

What is more, the reflection spectrum of the object being heated has a complicated profile and could have multiple ranges where the intensity of the reflected wave decreases locally according to the frequency. On top of that, the profile of the reflection spectrum could often change dynamically during the heating process. For these reasons, according to the conventional techniques disclosed in Patent Documents Nos. 1 and 2, even if such a frequency that will lead to a locally low reflected wave intensity could be detected temporarily but if the condition of the object being heated varied as the heating process advances, the frequency that will lead to the lowest reflection intensity could also change significantly. In such a situation, if the reflection spectrum of the object being heated changed, the best frequency could not be detected so as to keep up with that change. As a result, the solid-state amplifier could get damaged seriously by a reflected wave, of which the intensity has decreased steeply.

It is therefore an object of the present invention to provide an RF heating system that can radiate electromagnetic waves with the reflection power kept low by preventing the solid-state amplifier from getting damaged by the reflected wave and that can control the radiation frequency adaptively according to a change that could occur with time in the condition of the object being heated.

Solution to Problem

An RF heating system according to the present invention includes: a variable-frequency oscillator; a semiconductor power amplifier for amplifying the output of the variable-frequency oscillator; a radiator for radiating an electromagnetic wave for heating based on the output of the semiconductor power amplifier; a reflected wave monitoring circuit for detecting a reflected wave of the electromagnetic wave for heating; and a controller for controlling the oscillation frequency of the variable-frequency oscillator. The controller changes the oscillation frequencies of the variable-frequency oscillator discontinuously, thereby conducting a frequency-hopping spread-spectrum radiation.

In one preferred embodiment, the controller determines the probability of generation of each said oscillation frequency by reference to a relation between the intensity of the reflected wave that has been detected by the reflected wave monitoring circuit and the oscillation frequency.

In this particular preferred embodiment, the controller sets the probability of generation of the oscillation frequency in a frequency range in which the intensity of the reflected wave detected by the reflected wave monitoring circuit is relatively low higher than that of the oscillation frequency in a frequency range in which the intensity of the reflected wave is relatively high.

In a specific preferred embodiment, in an initial stage of a process for heating an object with the electromagnetic wave for heating, the electromagnetic wave for heating is radiated, and the relation between the intensity of the reflected wave detected by the reflected wave monitoring circuit and the oscillation frequency is observed, with the output of the semiconductor power amplifier adjusted to a relatively low value.

In this particular preferred embodiment, during the process for heating the object with the electromagnetic wave for heating, the controller updates the relation between the intensity of the reflected wave detected by the reflected wave monitoring circuit and the oscillation frequency, thereby changing the probabilities of generation of the oscillation frequency dynamically.

In still another preferred embodiment, during the process for heating the object with the electromagnetic wave for heating, the controller changes the oscillation frequencies of the variable-frequency oscillator discontinuously between a number of frequencies including a frequency at which the intensity of the reflected wave becomes a local minimum and a frequency at which the intensity of the reflected wave does not become a local minimum.

In yet another preferred embodiment, the RF heating system includes a heating chamber to be loaded with the object, and the controller changes the oscillation frequencies of the variable-frequency oscillator discontinuously between a number of frequencies that fall within the range of 2.40 GHz to 2.50 GHz.

In an alternative preferred embodiment, the RF heating system includes a heating chamber to be loaded with the object, and the controller changes the oscillation frequencies of the variable-frequency oscillator discontinuously at an interval of at most 1.0 millisecond.

In this particular preferred embodiment, the controller changes the oscillation frequencies of the variable-frequency oscillator discontinuously at an interval of at least 0.01 milliseconds.

In a specific preferred embodiment, the semiconductor power amplifier is a GaN HFET.

In yet another preferred embodiment, the oscillation frequencies are changed discontinuously following a frequency sequence that has been determined by the controller. The frequency sequence is determined by performing time-series filtering on a white random frequency series at a probability of generation associated with a normalized absorption rate, which is represented as a reverse of the relation between the intensity of the reflected wave and the oscillation frequency.

Another RF heating system according to the present invention includes multiple radiation units, each radiating an electromagnetic wave for heating at variable frequencies. Each radiation unit includes: a variable-frequency oscillator; a semiconductor power amplifier for amplifying the output of the variable-frequency oscillator; a radiator for radiating an electromagnetic wave for heating based on the output of the semiconductor power amplifier; and a reflected wave monitoring circuit for detecting a reflected wave of the electromagnetic wave for heating. The RF heating system further includes a controller for controlling the oscillation frequencies of the respective variable-frequency oscillators included in those radiation units. The controller changes the oscillation frequencies of the respective variable-frequency oscillators discontinuously so that there is no correlation at all between the frequencies of the radiation units, thereby getting a frequency-hopping spread-spectrum radiation done independently of each other by the respective radiators included in those multiple radiation units.

In one preferred embodiment, the controller determines the probability of generation of the oscillation frequency of the variable-frequency oscillator included in each radiation unit by reference to a relation between the intensity of the reflected wave that has been detected independently by the reflected wave monitoring circuit included in that radiation unit and the oscillation frequency.

An RF heating system driving method according to the present invention is a method for driving an RF heating system that includes: a variable-frequency oscillator; a semiconductor power amplifier for amplifying the output of the variable-frequency oscillator; a radiator for radiating an electromagnetic wave for heating based on the output of the semiconductor power amplifier; a reflected wave monitoring circuit for detecting a reflected wave of the electromagnetic wave for heating; and a controller for controlling the oscillation frequency of the variable-frequency oscillator. The method includes the steps of: (A) radiating an electromagnetic wave for heating by the radiator while changing the oscillation frequencies of the variable-frequency oscillator discontinuously; (B) detecting the intensity of a reflected wave of the electromagnetic wave for heating by the reflected wave monitoring circuit and finding a relation between the intensity of the reflected wave and the oscillation frequency; and (C) locating a frequency range in which the reflected wave has a relatively low intensity by reference to the relation between the intensity of the reflected wave and the oscillation frequency that has been found in the previous step (B). The step (A) includes setting the probability of generation of the oscillation frequency in a frequency range in which the reflected wave has a relatively low intensity higher than that of the oscillation frequency in a frequency range in which the reflected wave has a relatively high intensity.

In one preferred embodiment, the step (C) includes determining an oscillation frequency, at which the reflected wave has the lowest intensity, by reference to the relation between the intensity of the reflected wave and the oscillation frequency that has been found in the step (B).

Advantageous Effects of Invention

According to the present invention, the frequency that will lead to the lowest intensity of the reflected wave (i.e., the reflection power) is detected by frequency hopping. Thus, there is no need to perform the monitor mode operation with low power, and therefore, the heating process can get done in a shorter time. Also, even if the condition of the object in the heating chamber changed with time, the heating process conditions can always be optimized by performing that frequency hopping during the heating process. That is to say, according to the present invention, the heating process is not performed continuously at a frequency at which the reflected wave has a local minimum intensity but hopping is done from such a frequency at which the reflected wave has a local minimum intensity to another frequency at which the reflected wave does not have a local minimum intensity in the middle of the heating process.

By getting that frequency hopping done a number of times at short intervals, the electromagnetic wave is never radiated for a long time at such a frequency at which the reflected wave has a high intensity, thus preventing the semiconductor power amplifier from getting damaged by an intense reflected wave. On top of that, there is no need to provide an isolator anymore in order to protect the environment from the reflected waves. As a result, the size and cost of the heating system can be reduced. Added to that, since the distribution of the electromagnetic field in the heating chamber can be changed by that frequency hopping, the object can be heated uniformly even without stirring up radio waves or using a turntable.

In an embodiment in which a single RF heating system includes multiple lines of power amplifiers and radiators, the radiation frequencies can be changed so as to have no correlation at all between those lines. As a result, the reflected waves of the respective lines can be monitored accurately. On top of that, the heating process can get done with reduced power dissipation, thus saving a lot of energy efficiently.

What is more, the RF heating system of the present invention does not use any magnetron, and therefore, each radiation spectrum is narrow enough to be adjusted appropriately to its proper permissible radiation range. As a result, the electromagnetic compatibility (EMC) can be improved, and the overall cost can be cut down, too, because a number of parts that would otherwise be needed to improve the EMC can be omitted according to the present invention.

BRIEF DESCRIPTION OF DRAWINGS

FIG. 1 illustrates the principle of spread spectrum RF heating according to the present invention, wherein FIG. 1(a) illustrates how the radiated wave intensity (i.e., radiation power) varies with time while frequency hopping is carried out, FIG. 1(b) is a graph illustrating how the reflected wave intensity (i.e., reflected power) varies with time, and FIG. 1(c) is a graph showing the frequency dependence of the reflected wave intensity.

FIG. 1(c) is a graph showing how the frequency varies with time.

DESCRIPTION OF EMBODIMENTS

Figure 1:
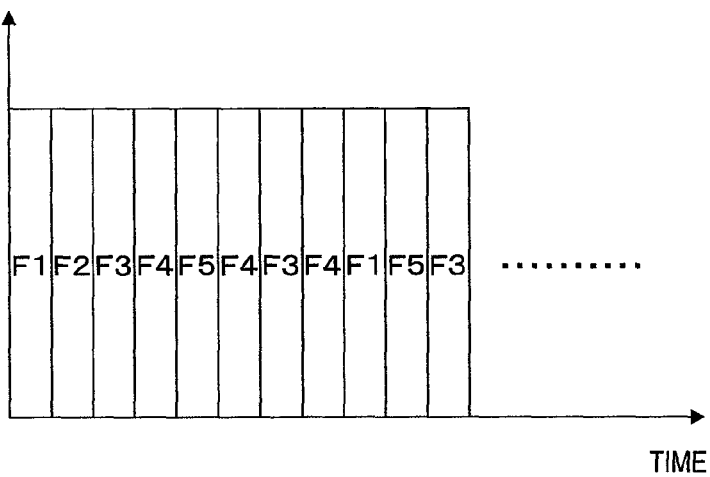
Figure 1:
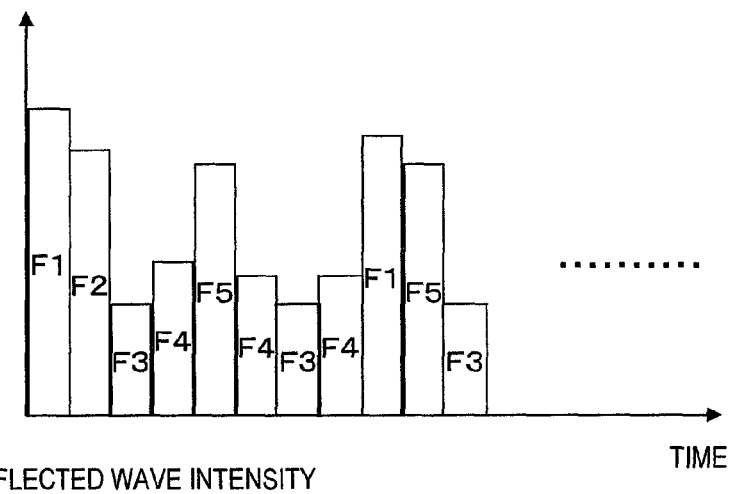
Figure 1:
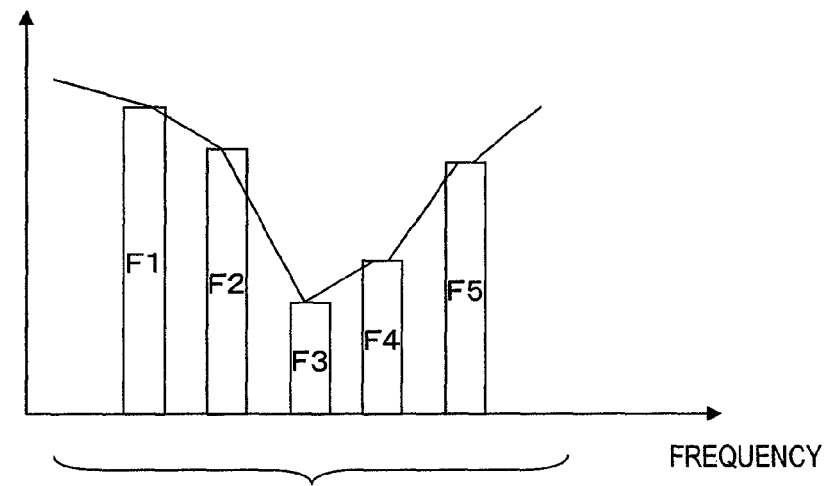

An RF heating system according to the present invention changes the oscillation frequencies of a variable-frequency oscillator discontinuously within a particular range, thereby getting frequency-hopping spread-spectrum radiation done. Just like the "spread spectrum" technology that is extensively used in the field of radio communications, the "frequency hopping spread spectrum" technology to be described herein is a technique for expanding (or spreading) an electromagnetic wave frequency range from a line spectrum into a range with a predetermined band width.

According to the present invention, the frequency of the electromagnetic wave that irradiates the object to be heated is not fixed but changed one after another between multiple discrete values (i.e., discontinuous values) that fall within a particular frequency range. That is to say, the electromagnetic wave is radiated for just a short period of time at each of those discrete frequencies and hopping is done immediately to the next frequency. That is why even if the object to be heated were irradiated with a strong electromagnetic wave at a frequency associated with a high reflected wave intensity (i.e., a low absorption index), the frequencies would be changed to the next value before the solid-state power amplifier gets damaged by that reflected wave. As a result, it is possible to prevent the solid-state power amplifier from getting damaged by the reflected wave.

Before preferred embodiments of the present invention are described, the fundamental principle of "spread spectrum heating" adopted in the present invention will be described.

"Spread spectrum" is a technique that is well known in the field of radio communications and is roughly classified into a technique called "frequency hopping" and a technique called "direct sequence". Unlike radio communications for transmitting information in a free space, the RF heating system of the present invention radiates RF energy into a heating chamber that is a closed space and gets the energy absorbed into the object to be heated, thereby transforming the electromagnetic wave into heat. However, the RF energy is also radiated according to the present invention with its frequency spectrum spread over a particular range as in the spread spectrum technique in the field of radio communications, and therefore, the technique of the present invention will be referred to herein as "spread spectrum heating".

As described above, a magnetron oscillates directly. When regarded as a sort of oscillator, a magnetron has a low Q value. That is why the frequency spectrum of RF waves radiated from a magnetron has a gently rising and falling broad distribution with a lot of noise components. Meanwhile, according to the present invention, as a variable-frequency oscillator and a semiconductor power amplifier are used, the oscillator has a high Q value. For that reason, the frequency spectrum of the output RF signal of the oscillator is a substantially "line spectrum", which has a sharp peak at an arbitrary frequency. The semiconductor power amplifier amplifies an RF signal with such a line spectrum, and a high power electromagnetic wave with a substantially line spectrum (and with a half width of 1 kHz, for example) can be radiated. If the oscillation frequency of the variable-frequency oscillator is varied within the range of 2.40 GHz through 2.50 GHz, for example, the frequency of the electromagnetic wave for heating that has been radiated by the radiator (i.e., radiation frequency) will also vary within the same range according to the oscillation frequency.

According to the present invention, a number of candidate frequencies are set in advance within the particular frequency range in which the electromagnetic waves can be radiated. Specifically, n candidate frequencies F1, F2, . . . and Fn (where n is a natural number that is equal to or greater than three and F1<F2, . . . <Fn is satisfied) are set in advance within the frequency range. While the RF heating system is operating, frequency hopping is done by changing the radiation frequencies every τ millisecond (ms) between the n candidate frequencies. In this case, the time interval τ may fall within the range of 0.1 to 1 ms and n may fall within the range of 256 to 1,024. By setting the frequency hopping interval τ to be 1 ms or less in this manner, the frequencies can be changed before the solid-state power gets damaged by the reflected wave. When the n candidate frequencies are picked from the range of 2.40 GHz to 2.50 GHz, the interval between two adjacent frequencies on the frequency axis (e.g., F3-F2 interval) may be approximately 0.1-0.4 MHz. The Fn-F1 interval may be set to be 100 MHz or less. However, if this interval were too small, the effect to be achieved by the spread spectrum of frequencies could not be accomplished. For that reason, the Fn-F1 interval is preferably at least equal to 80 MHz.

FIG. 1(a) illustrates an example in which the oscillation frequencies are changed at a regular interval of τ milliseconds between the four candidate frequencies F1, F2, F3, F4 and F5 (where F1<F2, . . . <F5). In this example, the oscillation frequencies change in the order of F1→F2→F3→F4→F5→F4→F3→F4→F1→F5→F3 with time.

FIG. 1(b) illustrates how the intensity of reflected power varies as the frequencies are changed as described above. Since the object to be heated has its reflectance varied according to the frequency of the electromagnetic wave radiated, the reflected powers observed varied according to the frequency as shown in FIG. 1(b).

FIG. 1(c) illustrates an exemplary relation between the intensity of the reflected power and the frequency. In this example, the reflected power is the smallest at a frequency F3, which means that the electromagnetic wave is absorbed into the object to be heated most efficiently at the frequency F3.

In the example illustrated in FIG. 1(a), the frequency never varies monotonically. A gradual increase or decrease in frequency will be referred to herein as a "monotonic" variation in frequency, while a non-monotonic variation in frequency will be referred to herein as a "random" variation. However, the "random" variation does not exclude a regular variation and does not require that the probabilities of generation of respective frequencies over a sufficiently long period of time be equal to each other. That is to say, the probability of generation of a particular frequency could be high and those of the other frequencies could be low.

In this case, supposing the probabilities of generation of the n candidate frequencies are equal to each other, the spectrum of those n frequencies F1 through Fn will have a uniform distribution and the power at each of those frequencies is 1/n of the overall output power $P_{out}$. At those n frequencies F1 through Fn, reflected wave intensities $P_{ref}i$ (where i=1, . . . and n) are observed. If no power loss was caused by anything other than the object to be heated, the power $P_{abs}i$ absorbed into the object to be heated would be obtained by $P_{abs}i=P_{out}-P_{ref}i$. That is to say, at a frequency leading to little reflection, the heating is done with the electromagnetic wave energy absorbed with a high absorption index. For that reason, to get the heating process done efficiently, the probability of generation of such a frequency leading to little reflection may be set to be relatively high so that the radiation at such a frequency leading to little reflection prevails. For example, if the reflected power has the frequency dependence shown in. FIG. 1(c), the probability of generation of the frequency F3 may be increased in order to get the heating process done efficiently.

According to the present invention, hopping is done between multiple frequencies in order to determine (i.e., search for) the frequency leading to the lowest reflected wave intensity. However, there is no need to carry out that search as a monitor mode operation before the heating process gets started. Instead, frequency hopping may be done while the object to be heated is heated after the heating process has started or may also be done with low power before the object to be heated starts to be heated.

Generally speaking, in a curve representing a relation between the frequency and the reflected wave intensity, the reflected wave intensity does not always have only one local minimum but the true minimum cannot be found unless the entire frequency range is searched. According to the conventional techniques disclosed in Patent Document Nos. 1 and 2, however, the local minimum of the reflected wave intensity that has been found earliest after frequency sweeping has started could be taken for the "true minimum" by mistake, and the true minimum could not be found after all. On top of that, the spectrum distribution of the reflected wave intensity may vary with time as the heating process advances. That is why even if the local minimum of the reflected wave intensity that has been found earlier than anything else happens to be the true minimum, that local minimum does not always continue to be the true minimum throughout the entire heating process.

According to the present invention, hopping is done at random between multiple discrete frequencies within a particular frequency range in which electromagnetic waves can be radiated, and therefore, the true minimum of the reflected wave intensity can be found by searching that particular frequency range in which electromagnetic waves can be radiated without being restricted to any local minimum. Consequently, without taking a mere local minimum of the reflected wave intensity (i.e., a so-called "local minimum") that has been found just by sweeping the frequency range monotonically for the true minimum, the true minimum can be located within the particular frequency range in which electromagnetic waves can be radiated. Among other things, the present invention is effectively applicable to a situation where the minimum of the reflected wave intensity has varied so significantly during the heating process that the previous minimum has become a local minimum and the true minimum has shifted to another frequency. According to the present invention, hopping is done at random within a particular frequency range in which electromagnetic waves can be radiated. For that reason, unlike a method for re-searching for the frequency leading to the minimum just by sweeping the frequency range surrounding the currently selected frequency that would produce a minimum, even if there is another local minimum at a different frequency between the local minimum at the currently selected frequency and the true minimum at another, new frequency, the frequency leading to the true minimum of the reflected wave intensity can be found without allowing the selected frequency to converge to that another local minimum.

According to the frequency hopping method, electromagnetic waves are radiated at a different frequency from the frequency that will lead to the lowest reflected wave intensity. However, if the average reflected power can be reduced, then the efficiency of heating can be improved. To do that, hopping may be done to another one of the frequencies that are spread over a broad frequency range (of 2.40 GHz through 2.50 GHz) with the probability of generation of the frequency leading to a low reflected wave intensity set to be high. Even if the electromagnetic wave is radiated during the hopping at a frequency associated with a high reflected wave intensity but if the time interval τ is set to be very short, then it is possible to prevent the reflected wave from damaging the semiconductor power amplifier. The upper limit of the time interval τ is determined so as to prevent the reflected wave from damaging the semiconductor power amplifier. For example, if the frequency hopping interval τ is set to be 1 ms or less, the frequencies can be changed before the solid-state power amplifier gets damaged by the reflected wave. On top of that, by setting the frequency hopping interval τ to be 1 ms or less, the effect of spread frequencies can be achieved during the hopping within the 100 MHz range of 2.40 GHz through 2.50 GHz, which is normally used to heat some matter.

The lower limit of the frequency hopping interval τ is not particularly limited but can be set to be any value as long as the oscillator can keep up with the change of frequencies. According to the current state of the art, the frequency hopping interval τ is preferably at least equal to 0.01 ms. On the other hand, if the system needs to be realized at as low a cost as possible, the frequency hopping interval τ is preferably equal to or longer than 0.1 ms.

By shortening the interval τ in this manner, hopping can be done between a lot of frequencies including a one at which the reflected wave intensity does not become a local minimum. As a result, even if the frequency that will lead to the lowest reflected wave intensity varied significantly during the heating process, such a frequency that will lead to the lowest reflected wave intensity can be searched for appropriately within a broad range.

According to the present invention, the heating efficiency of a solid-state RF heating system can be improved and damage to be done on a semiconductor power amplifier can be minimized.

Embodiment 1

Hereinafter, a first specific preferred embodiment of an RF heating system according to the present invention will be described.

Figure 2:
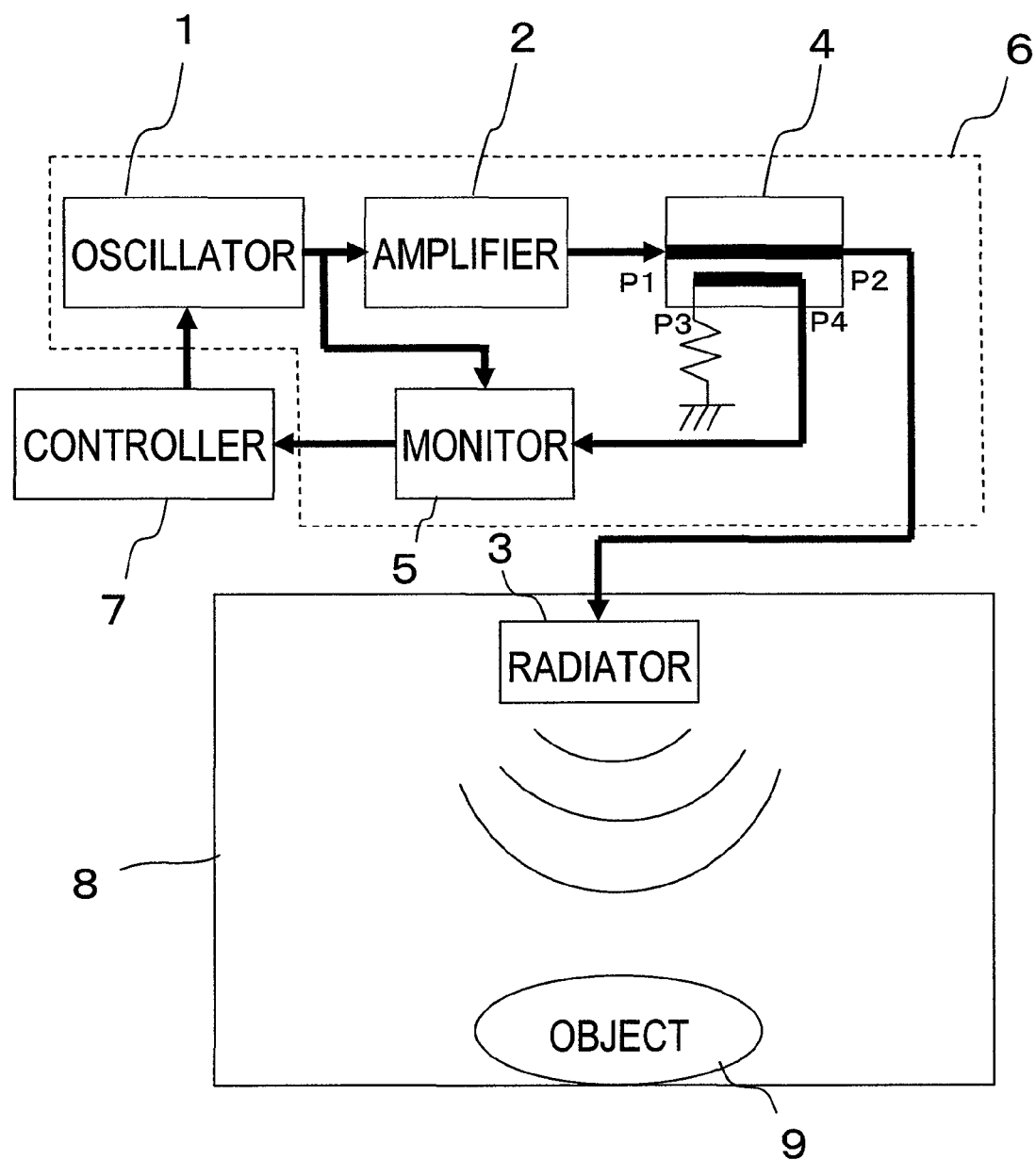
FIG. 2 is a block diagram illustrating a first specific preferred embodiment of an RF heating system according to the present invention.

First of all, look at FIG. 2, which is a block diagram illustrating an RF heating system as a first preferred embodiment of the present invention. The RF heating system shown in FIG. 2 includes a variable-frequency oscillator 1, a semiconductor power amplifier 2 for amplifying the output of the variable-frequency oscillator 1, a radiator 3 for radiating an electromagnetic wave for heating based on the output of the semiconductor power amplifier 2, a reflected wave monitoring circuit 5 for detecting a reflected wave of the electromagnetic wave for heating, and a controller 7 for controlling the oscillation frequency of the variable-frequency oscillator 1. The controller 7 changes the oscillation frequencies of the variable-frequency oscillator 1 discontinuously, thereby getting frequency-hopping spread-spectrum radiation done by the radiator 3. The electromagnetic wave radiated from the radiator 3 irradiates an object to be heated (which is usually food) 9, with which a heating chamber 8 is now loaded, thereby heating the object 9 to be heated.

In the RF heating system of this preferred embodiment, a directional coupler 4 is arranged between the semiconductor power amplifier 2 and the radiator 3 and is connected to the reflected wave monitoring circuit 5. In this preferred embodiment, the variable-frequency oscillator 1, the semiconductor power amplifier 2, the directional coupler 4, and the reflected wave monitoring circuit 5 together form a radiating circuit 6. And the radiating circuit 6 and the radiator 3 that is connected to the radiating circuit 6 together form a single radiation unit.

In this preferred embodiment, a frequency synthesizer with a phase-locked loop (PLL) may be used as the variable-frequency oscillator 1. In accordance with the given digital data representing frequency specifying information, the variable-frequency oscillator 1 determines the oscillation frequency.

The semiconductor power amplifier 2 may be implemented as a multi-stage amplifier that uses, as its final stage, an HFET (heterojunction two-dimensional electron gas field effect transistor) of GaN, for example. A magnetron is a high-power amplifier itself. According to this preferred embodiment, however, a semiconductor power amplifier is used separately from the oscillator. Thanks to recent advancement of semiconductor device processing technologies, it is now possible to realize a power amplifier with an output of several hundred W even in the 2.4 GHz range.

The radiator 3 is an antenna that radiates radio waves. To make the radiator 3 have a structure that can deal with high power applications and to radiate radio waves inside a heating chamber 8, which is a closed space, the impedance of the entire system should be matched and the radiation property should be examined.

The directional coupler 4 is a coupler, which is implemented as a quarter-wave coupled transmission line, for example. Most of an RF signal that has been input through Port #1 P1 is output through Port #2 P2 and some of the signal is also output through Port #3 P3 after having been reduced by the coupled quantity but is not output through Port #4 P4. On the other hand, most of an RF signal that has been input through Port #2 P2 is output through Port #1 and some of the signal is also output through Port #4 after having been reduced by the coupled quantity but is not output through Port #3. That is why in a situation where high-power electromagnetic waves are radiated with the output of the power amplifier 2 supplied through Port #1 and with Port #2 coupled to the radiator, the reflected wave intensity can be observed by monitoring the output of Port #4 with Port #3 terminated.

The reflected wave monitoring circuit 5 is connected to Port #4 of the directional coupler 4 and measures the reflected wave intensity. A conventional reflected wave monitor senses the output of Port #4 using a diode and generates an output voltage that is substantially proportional to the reflected power. On the other hand, according to this preferred embodiment, the frequency hopping technique is adopted for radiation purposes. That is why if the reflected wave is demodulated following a frequency sequence that has been generated by itself, only its own reflected wave can be observed. As every other signal that does not follow that frequency sequence becomes noise, its output becomes zero if the average is worked out over a certain period of time.

Figure 3:
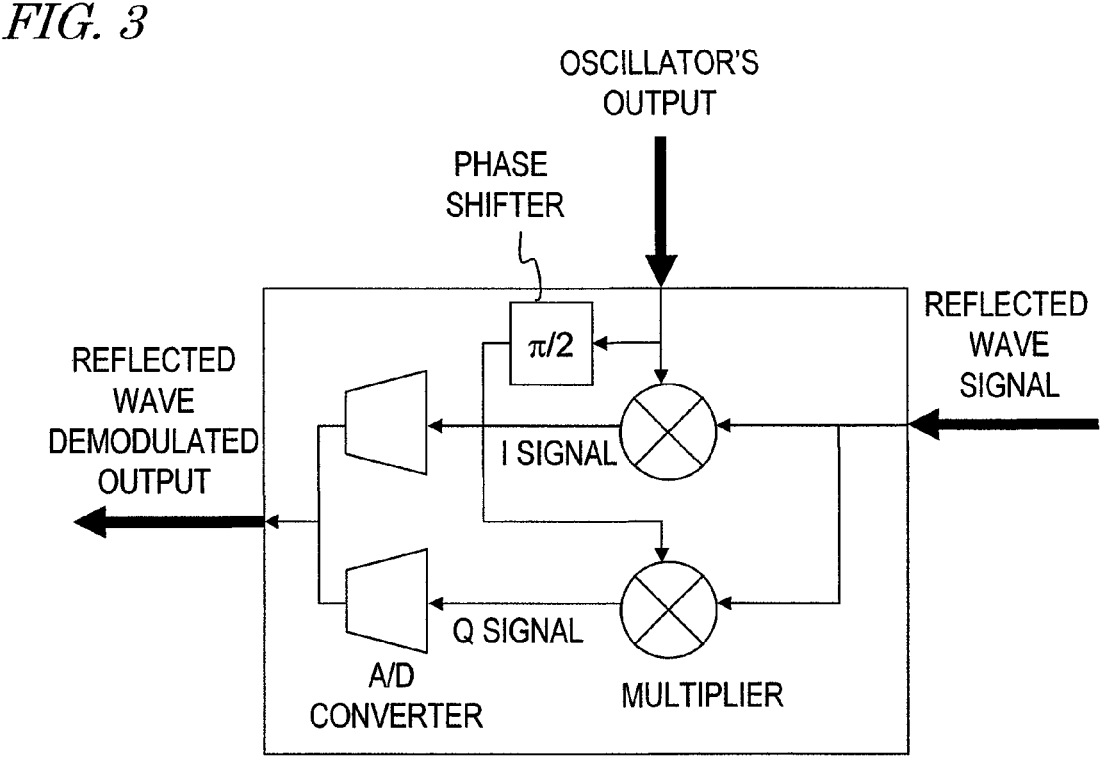
FIG. 3 illustrates an exemplary configuration for the reflected wave monitoring circuit of the first preferred embodiment.

The reflected wave monitoring circuit 5 may have a configuration as shown in FIG. 3, for example. The reflected wave monitoring circuit 5 shown in FIG. 3 receives a reflected wave signal and adds up the outputs supplied from the oscillator 1 shown in FIG. 2 and the outputs obtained by shifting the phase of the former outputs by $\pi/2$ with respect to that signal. Then, signals thus obtained (i.e., I and Q signals, which are analog signals) are converted by an A/D converter into digital signals, which are then output as reflected wave demodulated signals.

The radiating circuit 6 is made up of the variable-frequency oscillator 1, the semiconductor power amplifier 2, the directional coupler 4 and the reflected wave monitoring circuit 5. If this radiating circuit 6 is connected to the radiator 3 and supplied with power from a power supply unit, high-power RF output can be obtained with this single set alone. Optionally, if multiple units, each consisting of the radiating circuit 6 and the radiator 3, are provided, then the output can be further augmented by spatial power combining. A preferred embodiment with such a configuration will be described in detail later.

The controller 7 is a circuit that supplies data instructing the oscillation frequency to the variable-frequency oscillator 1 in accordance with the reflected wave intensity information that has been provided by the reflected wave monitoring circuit 5. Following an algorithm that has been defined in advance, the controller 7 instructs the oscillation frequency with the probability of generation changed on a frequency-by-frequency basis. The reflected wave intensity information may be either an analog signal or a digital signal. However, it is preferred that the reflected wave intensity information be the output of the reflected wave monitoring circuit 5 that has been digitized by the A/D converter because the desired algorithm can be carried out by a microprocessor. In that case, the controller 7 can supply the frequency data that has been digitized following the frequency sequence to be described later to the PLL of the variable-frequency oscillator 1.

Figure 4:
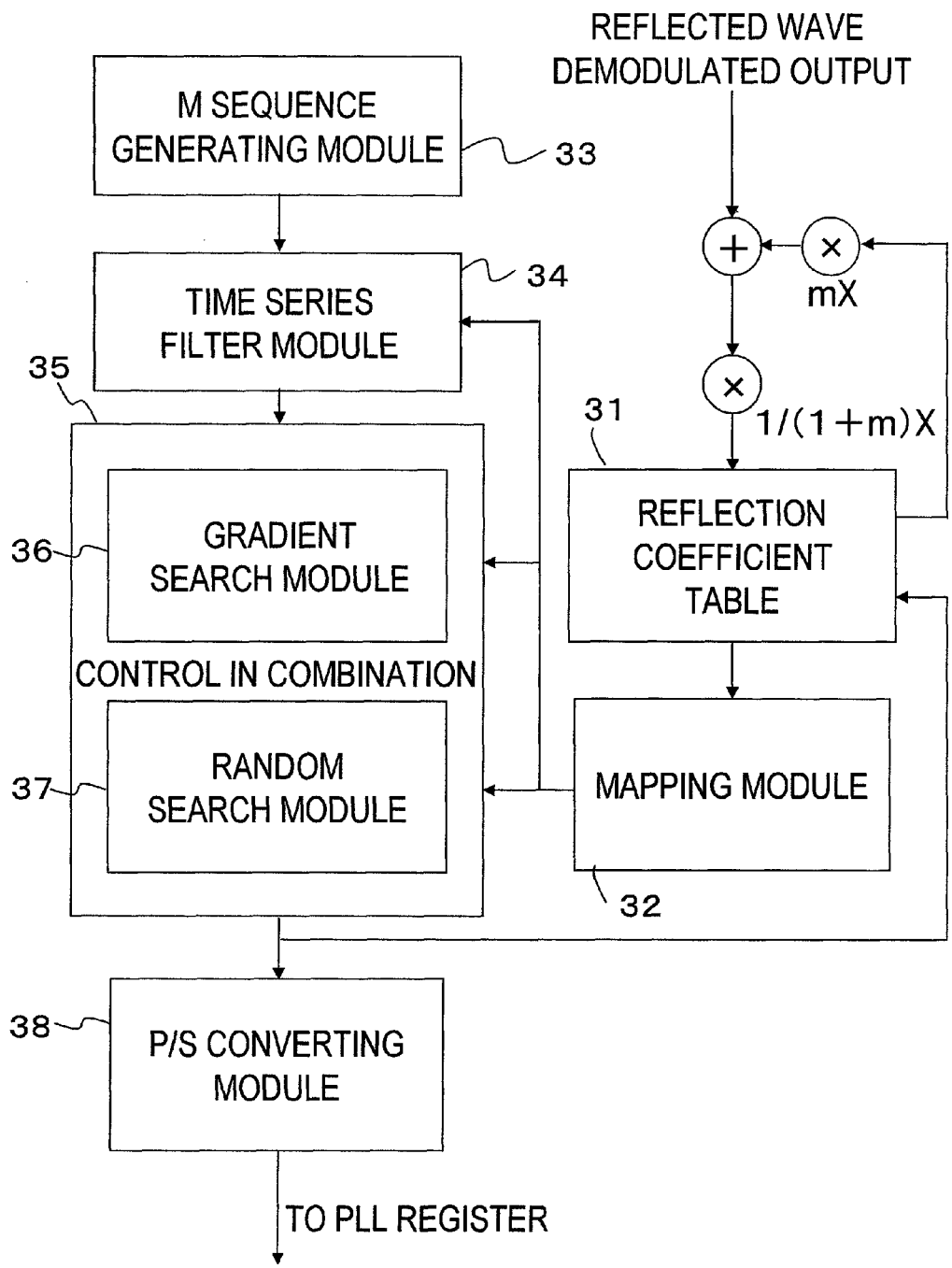
FIG. 4 illustrates an exemplary configuration for the controller of the first preferred embodiment.

The controller 7 may have a configuration such as the one shown in FIG. 4, for example. The controller 7 shown in FIG. 4 is a digital circuit and could be implemented as a software module, for example.

A reflected wave demodulated signal (representing the latest data), which has been supplied from the reflected wave monitoring circuit 5, is added to the product obtained by multiplying together the previous data that has been read out from a reflection coefficient table 31 and a forgetting factor m (where 0<m<1), and then the sum is written on the reflection coefficient table 31. If m=0.7, for example, the previous data is multiplied by 0.7, the product is added to the latest data, and then the sum is divided by 1.7 (=m+1) so as be standardized. As the previous data about reflection coefficient is multiplied in this example by 0.7 every time the data is updated, the influence decreases gradually in the order of 0.49, 0.35 and so on.

The reflected wave is monitored at a radiation frequency that has been specified by a search module 35. That is why the reflection coefficient table 31 is not rewritten simultaneously at every frequency but is updated at the new frequency every time the radiation frequency hops.

The data that has been written on the reflection coefficient table 31 is mapped by a mapping module 32 that adds an appropriate weight to each reflection coefficient. The mapped data is then referred to by a time series filter module 34, thereby generating a frequency hopping signal, of which the frequency spectrum is associated with the reflection coefficients. More specifically, filtering is carried out so as to increase the probability of generation at such a frequency associated with a small reflection coefficient.

The search module 35 includes a gradient search module 36 and a random search module 37. Since these modules are combined appropriately, the search can be done both quickly and effectively so as not to get trapped in a local minimum. Normally, a random search is carried out by the random search module 37. And only when the search needs to be done quickly, a gradient search is also carried out by the gradient search module 36. The radiation frequency information that has been obtained in this manner is converted into serial data by a parallel/serial (P/S) converting module 38 and then the serial data is supplied to a PLL register.

The heating chamber 8 prevents the RF power radiated from scattering and confines the RF energy, thereby heating (or warming) the object 9 to be heated (which is food in most cases if the heating system is a microwave oven) efficiently.

Next, an exemplary algorithm for determining the frequency sequence will be described with reference to FIG. 5. It should be noted, however, that this is just an example. The most efficient frequency sequence pattern varies according to the shape of the heating chamber 8, the electrical characteristic of the radiator 3, the expected property of the object 9 to be heated and other factors. For that reason, the best algorithm to adopt is preferably determined on a situation-by-situation basis. The "frequency sequence" that can be used effectively in this preferred embodiment is determined so as to make the probability of generation of a frequency leading to low reflected wave intensity relatively high.

Figure 5:
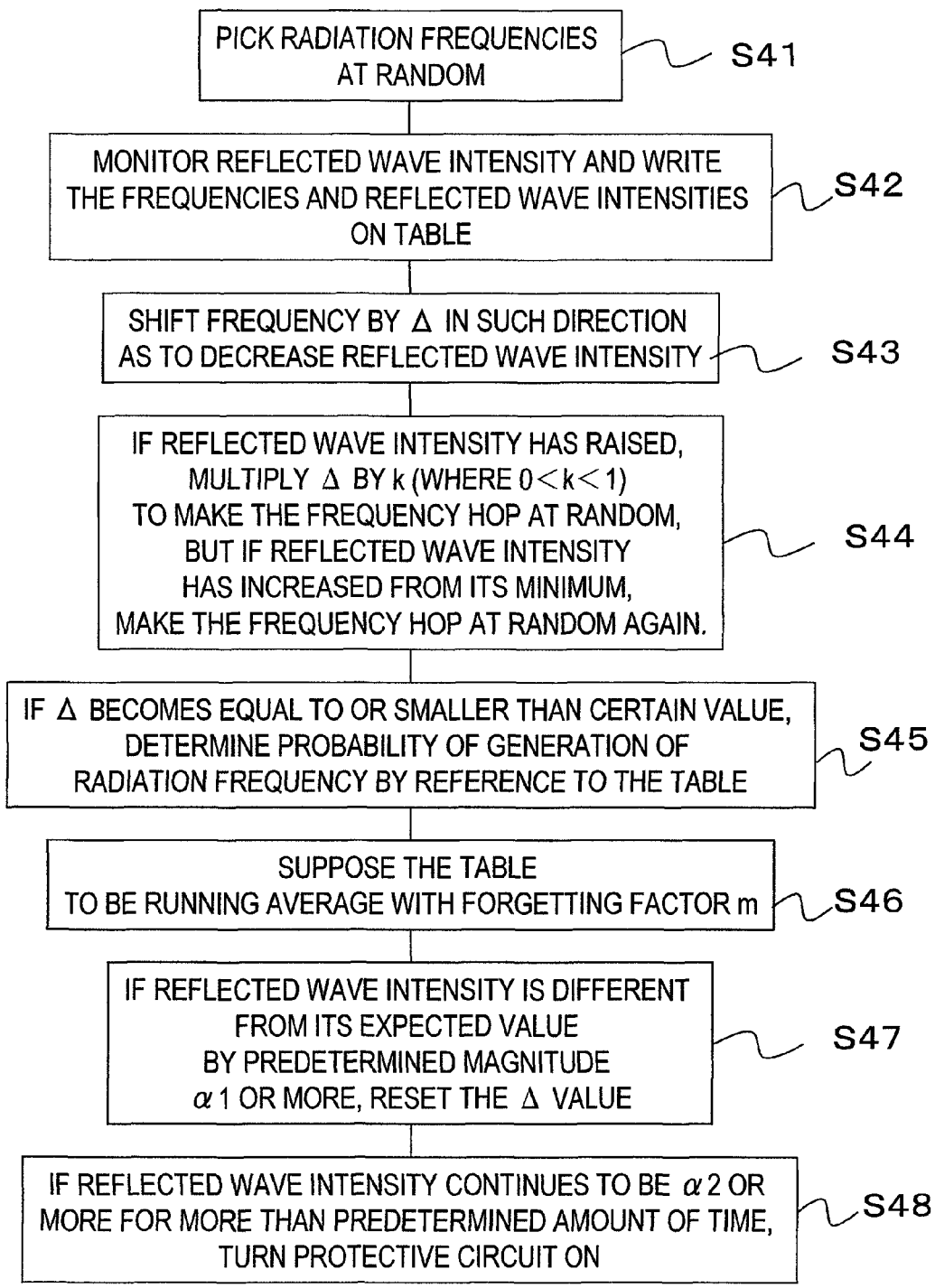
FIG. 5 is a flowchart showing an exemplary algorithm for determining a frequency sequence according to the present invention.

According to the flowchart shown in FIG. 5, first of all, a series of radiation frequencies is determined at random to search for a frequency leading to low reflected wave intensity (in Step S41). For example, 1,000 frequencies F1, F2, . . . and F1000 are set in the range of 2.40 GHz through 2.50 GHz. In that case, if those frequencies are set at regular intervals, the interval between two adjacent frequencies will be 100 kHz (=1,000 MHz÷1,000). Then, 100 candidate frequencies are picked from those 1,000 frequencies.

Then, electromagnetic waves are radiated with the actual frequency hopped to any of those candidate frequencies at a time interval $\tau$ (which may be approximately 1 ms, for example). In this preferred embodiment, the mode in which the frequency range is swept with low power before the heating process is not carried out but the electromagnetic waves may start to be radiated with power that is high enough to heat the object to be heated sufficiently (e.g., with the maximum power) from an early stage of the radiation process.

The frequencies of the electromagnetic waves radiated by the radiator 3 are determined to be a series that has been picked at random from those candidate frequencies and are supposed to be hop at short intervals. In the meantime, the reflected wave monitoring circuit 5 in the radiator 6 monitors the reflected waves and the reflected wave intensities monitored and the frequencies are written on the table one after another (in Step S42).

As used herein, the "series of frequencies" refers to either a series of multiple candidate frequency values or a code sequence representing multiple candidate frequency values. According to this preferred embodiment, candidate frequencies are initially selected from a relatively broad range and the frequencies are changed one after another between those candidate frequencies.

As a result of these processing steps, a rough relation between the frequency and the reflected wave intensity can be detected in the range of 2.40 GHz through 2.50 GHz, for example. And based on this rough relation, at least one frequency range that will lead to relatively low reflected wave intensity (e.g., a range with a width of 10 MHz, for example) can be determined.

Next, the operation of detecting a frequency that will lead to the lowest reflected wave intensity from such a frequency range is performed. Specifically, a frequency that will lead to the lowest reflected wave intensity is selected as an initial value from those candidate frequencies that have been picked to define the rough relation described above. Next, electromagnetic waves are radiated at a frequency that has been increased by $\Delta$ from that initial value and at a frequency that has been decreased by $\Delta$ from that initial value in this order. In this manner, it can be determined, in Step S43, whether that increase or the decrease in frequency from the initial value results in the lower reflected wave intensity. After that, the frequency is made to hop to one of the multiple candidate frequencies (which are arranged at the regular interval (which will be referred to herein as the "width") $\Delta$) after another so as to decrease the reflected wave intensity. In this case, as the frequencies are supposed to be only discrete values, the width $\Delta$ becomes a multiple of the frequency step of the oscillator. For example, if the frequency step is 100 kHz, the width $\Delta$ may be defined to be 5 MHz.

The reflected wave intensity monitored has raised by increasing or decreasing the width $\Delta$ between frequencies, then $\Delta$ is multiplied by k (where 0<k<1) to make the frequency hop at random within the frequency range described above (in Step S44). In this processing step, $\Delta$ is also a multiple of the frequency step of the oscillator and may be set to be 1 MHz, for example. If a frequency that has led to an even lower reflected wave intensity has been detected in this manner, it can be determined whether or not a frequency before or after that frequency will further lower the reflected wave intensity. To do that, the width $\Delta$ is further narrowed and the frequency that has led to currently the lowest reflected wave intensity is increased and decreased by the width $\Delta$, thereby monitoring the resultant reflected wave intensity.

And if the reflected wave intensity monitored has increased from its smallest value that has ever been obtained, the frequency is made to hop again over a broad range.

A table that represents a relation between the frequency and the reflected wave intensity is drawn up either in the procedure described above or in any other procedure, and then the probabilities of generation of respective frequencies are determined in Step S45 by reference to that table. In this case, the probability of generation of the frequency that will lead to the lowest reflected wave intensity is set to be the highest. For example, if the probability of generation of such a frequency that will lead to the lowest reflected wave intensity is set to be 0.9, the overall probability of generation of the other frequencies is set to be 0.1. The probability of generation of such a frequency that will lead to the lowest reflected wave intensity is not set to be 1.0 in order to cope with a variation in the relation between the frequency and the reflected wave intensity to be observed as the object to be heated is heated.

Next, the frequency series is calculated by performing a time series filtering based on the probabilities of generation. Even in such a state, the table is also supposed to be a running average with a forgetting factor m (where 0<m<1) and always updated in Step S46. By updating the table in this manner, even the variation in reflected wave intensity with time can also be kept up with.

If the reflected wave intensity is different from its expected value by a predetermined magnitude $\alpha 1$ or more, then the width value $\Delta$ may be reset and the sequence described above may be performed all over again (in Step S47). Also, if the reflected wave intensity continues to be equal to or greater than a prescribed value $\alpha 2$ (which is a relatively high value and greater than $\alpha 1$) for more than a predetermined amount of time, then it may be determined that this is an abnormal state and the output of the semiconductor power amplifier may be decreased in Step S48, which is done to shield the semiconductor power amplifier 2 from an intense reflected wave.

Figure 6:
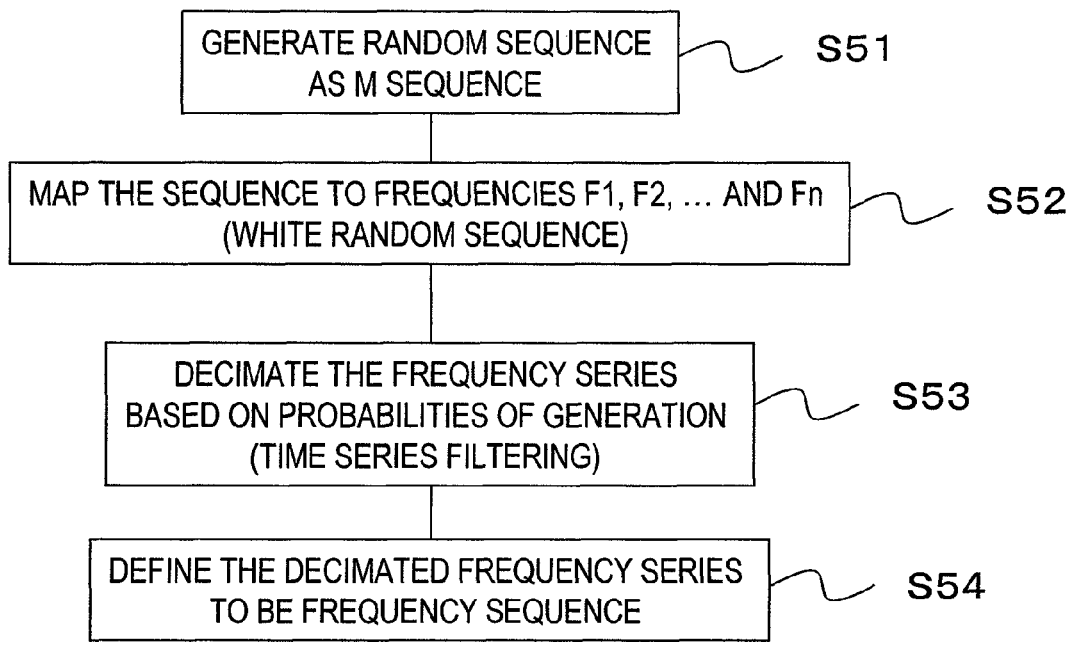
FIG. 6 is a flowchart showing how a frequency series is calculated by time series filtering according to the present invention.

Optionally, the series of radiation frequencies could be generated by reference to the table of probabilities generation by the time series filtering method to be described below. Hereinafter, such a method will be described with reference to FIG. 6.

First of all, a random sequence is generated as an M sequence in Step S51. Next, the sequence is mapped to frequencies F1, F2, . . . and Fn in Step S52. Then, a substantially uniform spectrum density at which the probability of generation is constant at every frequency Fi and which becomes white within the band width can be obtained.

Then, this frequency series is decimated based on the probabilities of generation in Step S53, which is the so-called "time series filtering". And the spread spectrum radiation is carried out using the decimated frequency series as a frequency sequence.

The probability of occurrence of every frequency Fi in the frequency sequence thus obtained becomes the same as the probability of generation written on the table. That is to say, the frequency spectrum rises where the reflected wave intensity is low and falls where the reflected wave intensity is high. Consequently, at such a frequency at which wave is almost totally reflected, the probability of radiation gets substantially equal to zero, and therefore, the semiconductor power amplifier can be protected from damage.

Hereinafter, an exemplary time series filtering algorithm that can be adopted in this preferred embodiment will be described with reference to FIGS. 7(a) through 7(d).

First of all, it will be described how to generate a pseudo random sequence. Various methods could be used to generate a pseudo random sequence. But in this example, an M sequence is supposed to be used. The M sequence is a sequence, of which the period is $2^N-1$ (where N is a natural number representing the number of bits). And the M sequence is usually obtained by a combination of a shift register and an adder that calculates an exclusive OR. Optionally, the pseudo random sequence could also be generated by performing a logical operation using a piece of software, instead of such hardware components.

In this example, the sequence is supposed to be made up of eight bits for the sake of simplicity. In that case, $x^8+x^6+x^5+x+1$ can be used as an irreducible primitive polynomial. Unless a sequence, of which everything is zero (i.e., (0, 0, 0, 0, 0, 0, 0, 0)), is used as an initial value, a pseudo random sequence with a period consisting of at most 255 bits can be generated. In this case, the probabilities of generation of zeros and ones are equal to each other and can be determined randomly.

Figure 7:
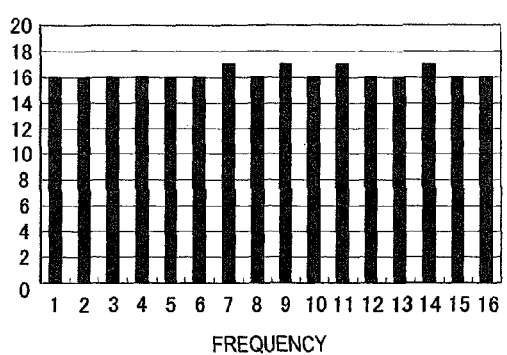
FIGS. 7(a) through 7(d) illustrate how to get the time series filtering done.
Figure 7:
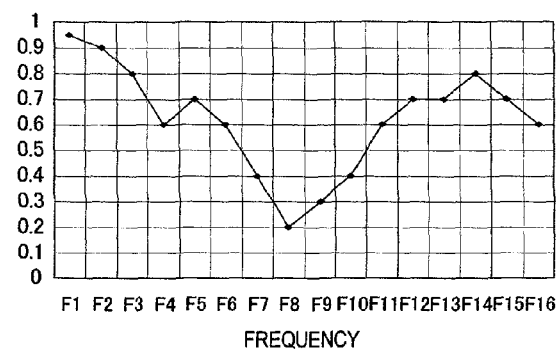
Figure 7:
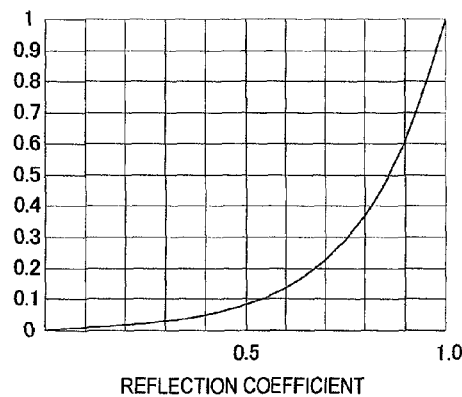
Figure 7:
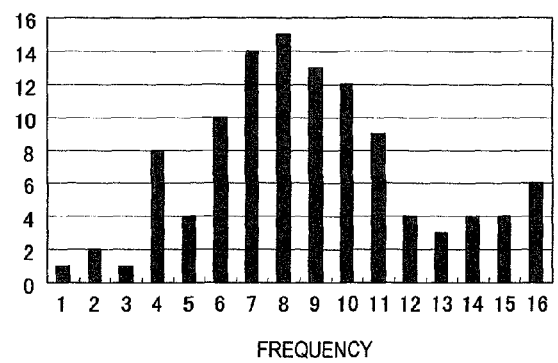

Suppose the initial value is (1, 1, 1, 1, 1, 1, 0, 1), for example. In that case, if this sequence is supposed to be a two-digit hexadecimal number (so that the former four bits represent one digit and the latter four bits represent the other digit) and repeatedly subjected to eight-bit shifting, then a sequence from 0 through 15 such as 15, 13, 13, 8, 14, . . . can be obtained. And if that sequence gets associated with F1, F2, . . . and F16 by adding one to each of those numbers, a frequency series consisting of sixteen frequencies can be obtained as shown in FIG. 7(a). As can be seen from FIG. 7(a), although the distribution of frequencies of occurrence has some unevenness, the probabilities of generation of the respective frequencies are substantially equal to each other.

Next, the frequency series is subjected to time series filtering using the reflection coefficients shown in FIG. 7(b) so that the smaller the reflection coefficient, the higher the probability of generation. FIG. 7(b) is a graph showing an exemplary frequency dependence of reflection coefficients, which was obtained using a reflected wave monitor. In the example illustrated in FIG. 7(b), the following reflection coefficients are supposed to be obtained for the respective frequencies F1 through F16: 0.95 for F1, 0.9 for F2, 0.8 for F3, 0.6 for F4, 0.7 for F5, 0.6 for F6, 0.4 for F7, 0.2 for F8, 0.3 for F9, 0.4 for F10, 0.6 for F11, 0.7 for F12, 0.7 for F13, 0.8 for F14, 0.7 for F15, and 0 for F16.

Supposing the probabilities of generation of the respective frequencies are equal to each other, the average reflection coefficient is 0.6219. That is to say, 62% plus of the radiated power is reflected back without being transformed into thermal energy that heats the food loaded.

According to this preferred embodiment, based on the distribution of reflection coefficients described above, mapping is carried out to produce a preferred probability of generation. In this example, mapping is carried out by adding a weight to each reflection coefficient Γi by calculating the following ratio:

$$\text{SQRT}((\exp(10\cdot\Gamma i)-\exp(0))/(\exp(10)-\exp(0)))$$

FIG. 7(c) is a graph showing a mapping function, in which the abscissa represents the reflection coefficient. This mapping function is characterized in that as the reflection coefficient increases from zero to one, the ordinate also increases from zero to one, and defines the weight added to the reflection coefficient. The mapping function can have its shape determined appropriately with the heating performance of the microwave oven taken into consideration. For each frequency, a random number γ, which has a value of one to zero, and the mapping function have their magnitudes compared to each other. If the mapping function has turned out to be the smaller, its frequency is adopted in the radiation frequency sequence. On the other hand, if the mapping function has turned out to the greater, its frequency is not adopted in the radiation frequency sequence. Optionally, the weighted reflection coefficient could be compared to the second or third power of γ.

By carrying out this filtering process a number of times, frequencies leading to relatively small reflection coefficients occur more and more often. FIG. 7(d) is a graph showing the distribution of the frequencies of occurrence of the radiation frequencies thus selected.

Embodiment 2

Hereinafter, a second preferred embodiment of an RF heating system according to the present invention will be described with reference to FIG. 8, which is a block diagram illustrating a configuration for the RF heating system of the second preferred embodiment.

Figure 8:
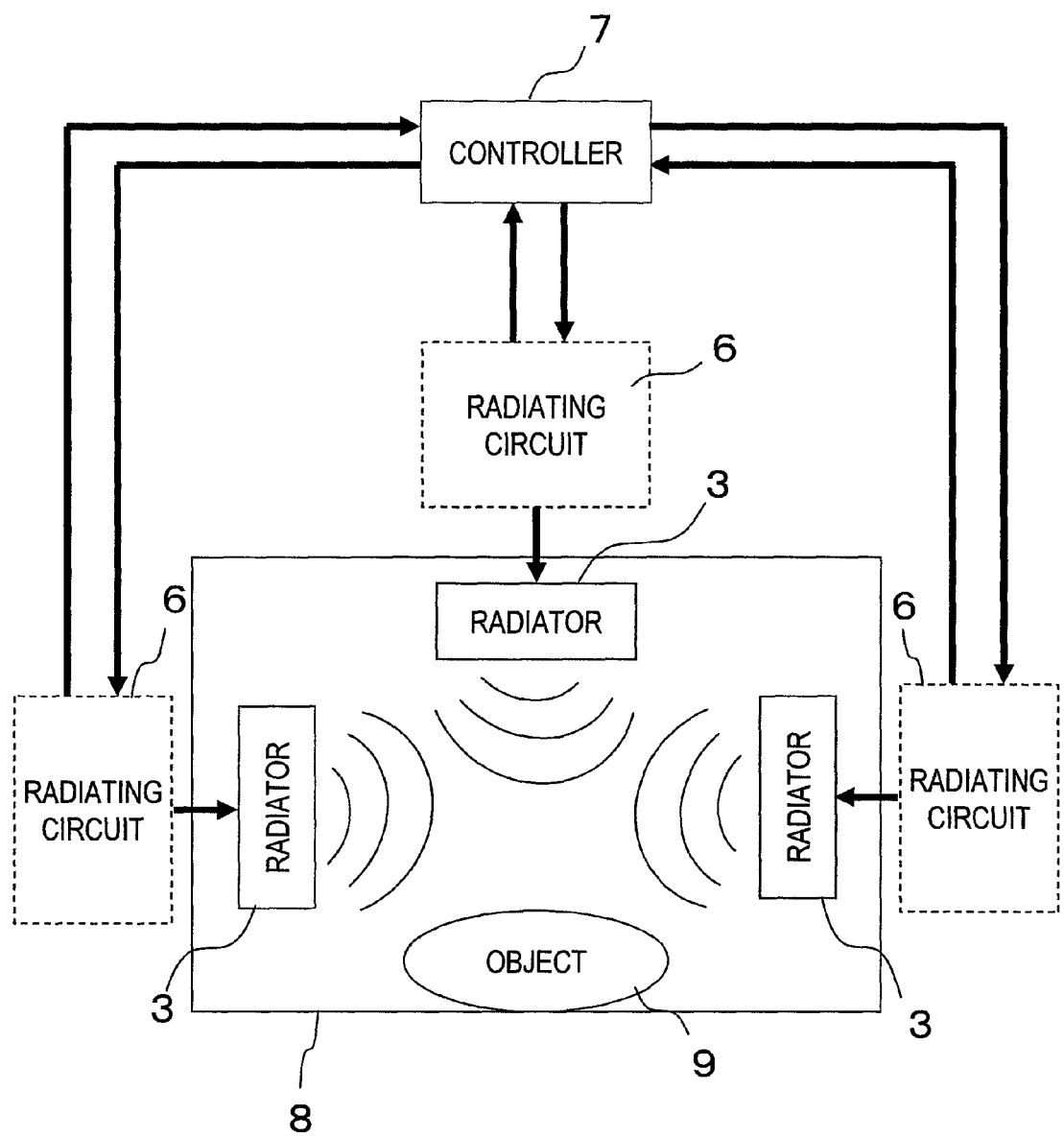
FIG. 8 is a block diagram illustrating a second specific preferred embodiment of an RF heating system according to the present invention.
Figure 9:
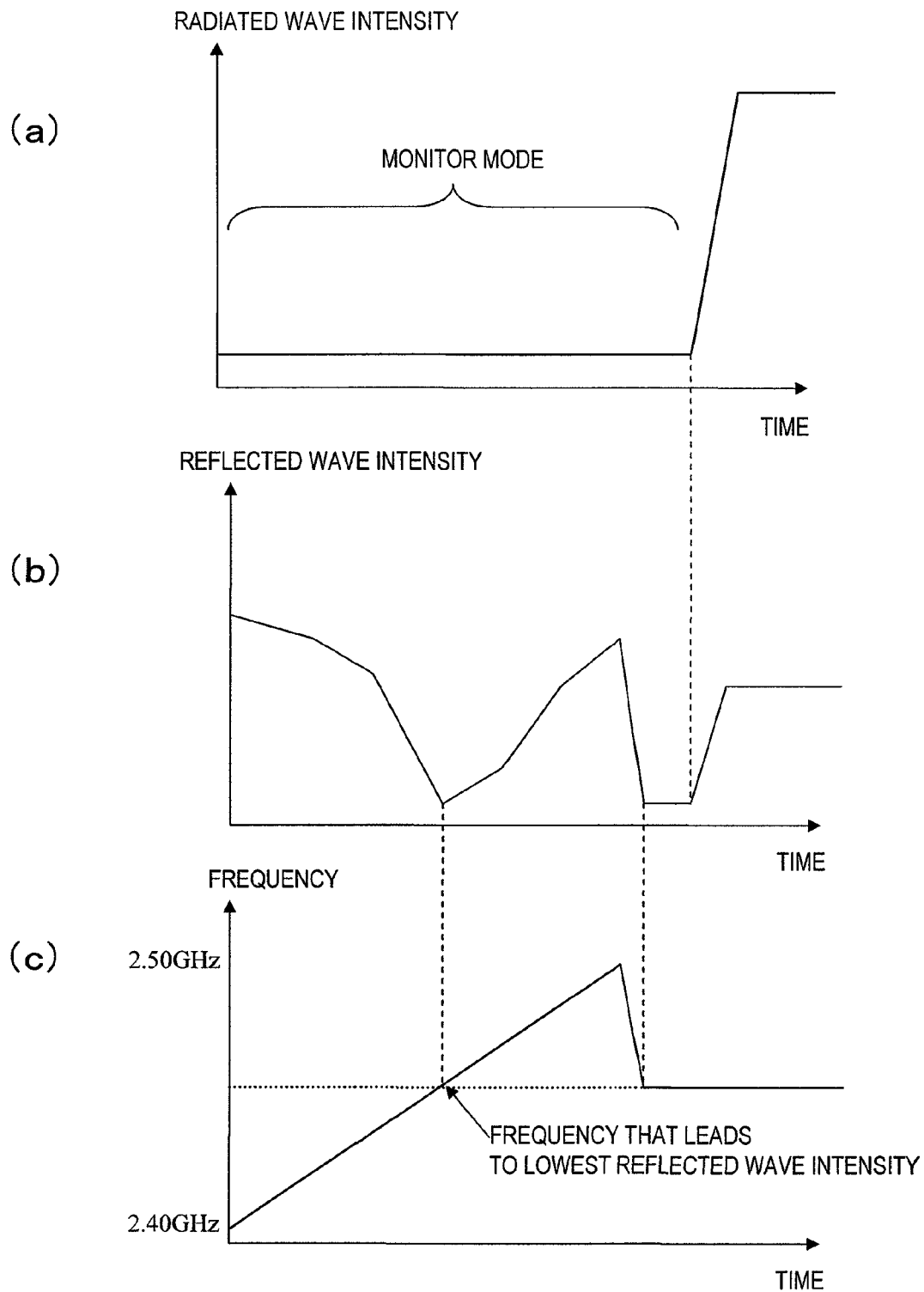
FIG. 9(a) is a graph showing how the intensity of a radiated electromagnetic wave (i.e., radiation power) varies with time in the monitor mode disclosed in Patent Document No. 1 and other documents.
FIG. 9(b) is a graph showing how the reflected wave intensity varies with time.

As shown in FIG. 8, the RF heating system of this preferred embodiment includes a number of radiating circuits 6, each including the variable-frequency oscillator 1, the semiconductor power amplifier 2, the directional coupler 4 and the reflected wave monitoring circuit 5. Also, each of those radiating circuits 6 is coupled to its associated radiator 3. Those radiators 3 are preferably arranged on mutually different wall surfaces of the same heating chamber 8 and preferably face the object 9 to be heated 9 in the heating chamber 8 at significantly different angles. Each of these components has basically the same structure, and operates in substantially the same way, as its counterpart of the first preferred embodiment described above, and the description thereof will be omitted herein to avoid redundancies.

In this preferred embodiment, each of those semiconductor power amplifiers 2 transmits a high power RF signal and its associated radiator 3 radiates an electromagnetic wave inside the heating chamber 8, where those electromagnetic waves radiated from the respective radiators 3 are superposed one upon the other, thereby getting spatial power combining done.

Each radiating circuit 6 of this preferred embodiment has its own variable-frequency oscillator 1. In a conventional solid-state RF heating system, multiple semiconductor power amplifiers are driven at the same radiation frequency with the output of a single oscillator divided. Thus, the configuration of this preferred embodiment is essentially different from the conventional one in this respect.

In a preferred embodiment in which frequency hopping is carried out, each of those radiating circuits 6 has its own variable-frequency oscillator 1, and therefore, the variable-frequency oscillators 1 in the respective radiating circuits 6 can have mutually different frequency sequences. If there is no correlation between the frequency sequences of those variable-frequency oscillators 1, then the respective radiating circuits 6 will always have mutually different oscillation frequencies except a very short period in which those frequencies happen to coincide with each other.

According to this preferred embodiment, in each of the radiating circuits 6, part of the output signal of the variable-frequency oscillator 1 is supplied to the reflected wave monitoring circuit 5, thereby getting synchronous demodulation done. Thus, the reflected wave monitoring circuit 5 can selectively monitor a reflected wave, of which the frequency is equal to that of the RF wave that has been radiated by the radiating circuit 6 including that reflected wave monitoring circuit 5. That is to say, the RF wave that has been radiated by any other radiating circuit 6 is suppressed as noise, and therefore, each radiating circuit 6 can detect properly only the reflected wave of the RF wave that has been radiated by itself.

As the inner space of the heating chamber 8 is surrounded with metal walls, an electromagnetic field distribution of standing waves is produced there. Such an electromagnetic field distribution is represented by the linear combination of specific resonant modes in a situation where the heating chamber 8 is regarded to be a hollow cavity. Actually, however, there is the object 9 to be heated inside the heating chamber 8, and therefore, the Q value decreases due to loss. As a result, the resonant frequency, which is an eigenvalue associated with the specific resonant mode, has broadened. The specific resonant mode of the heating chamber 8 varies one after another according to the frequency, and there are an infinite number of resonant frequencies. That is why by carrying out frequency hopping, the specific resonant mode to produce the resonance also changes one after another, and the distribution of standing waves also varies in the heating chamber 8 as a result. Consequently, the object can heated uniformly even without providing a turntable.

The controller 7 of this preferred embodiment has a similar configuration to the counterpart (7) of the first preferred embodiment described above, but does generate a number of frequency sequences that are not correlated to each other for those radiating circuits 6. According to this preferred embodiment, by combining a number of electromagnetic waves, of which the frequencies are different from each other and which vary with time, the heating efficiency of the solid-state RF heating system can be further improved.

INDUSTRIAL APPLICABILITY

The RF heating system of the present invention achieves increased heating efficiency and can also prevent its semiconductor power amplifier from getting damaged even without stopping the heating process, and therefore, can be used effectively in various types of RF heating systems including microwave ovens.

REFERENCE SIGNS LIST

1 variable-frequency oscillator
2 semiconductor power amplifier
3 radiator
4 directional coupler
5 reflected wave monitoring circuit
6 radiating circuit
7 controller

The invention claimed is:

1. An RF heating system comprising:
a variable-frequency oscillator;
a semiconductor power amplifier for amplifying an output of the variable-frequency oscillator;
a radiator for radiating an electromagnetic wave for heating based on an output of the semiconductor power amplifier;
a reflected wave monitoring circuit for detecting a reflected wave of the electromagnetic wave for heating; and
a controller for controlling an oscillation frequency of the variable-frequency oscillator,
wherein during a process for heating an object with the electromagnetic wave for heating, the controller changes the oscillation frequency of the variable-frequency oscillator discontinuously between a number of frequencies including a frequency at which the intensity of the reflected wave becomes a local minimum and a frequency at which an intensity of the reflected wave does not become a local minimum, thereby conducting a frequency-hopping spread-spectrum radiation.

2. The RF heating system of claim 1, wherein the controller sets a probability of generation of the oscillation frequency in a frequency range in which the intensity of the reflected wave detected by the reflected wave monitoring circuit is relatively low higher than that of the oscillation frequency in a frequency range in which the intensity of the reflected wave is relatively high.

3. The RF heating system of claim 2, wherein in an initial stage of the process for heating an object with the electromagnetic wave for heating, the electromagnetic wave for heating is radiated, and a relation between the intensity of the reflected wave detected by the reflected wave monitoring circuit and the oscillation frequency is observed, with the output of the semiconductor power amplifier adjusted to a relatively low value.

4. The RF heating system of claim 2, wherein during the process for heating the object with the electromagnetic wave for heating, the controller updates a relation between the intensity of the reflected wave detected by the reflected wave monitoring circuit and the oscillation frequency, thereby changing the probabilities of generation of the oscillation frequency dynamically.

5. The RF heating system of claim 1, comprising a heating chamber to be loaded with the object,
wherein the controller changes the oscillation frequencies of the variable-frequency oscillator discontinuously between a number of frequencies that fall within a range of 2.40 GHz to 2.50 GHz.

6. The RF heating system of claim 1, comprising a heating chamber to be loaded with the object,
wherein the controller changes the oscillation frequencies of the variable-frequency oscillator discontinuously at an interval of at most 1.0 millisecond.

7. The RF heating system of claim 6, wherein the controller changes the oscillation frequencies of the variable-frequency oscillator discontinuously at an interval of at least 0.01 milliseconds.

8. The RF heating system of claim 1, wherein the semiconductor power amplifier is a GaN HFET.

9. The RF heating system of claim 1, wherein the oscillation frequencies are changed discontinuously following a frequency sequence that has been determined by the controller, and
wherein the frequency sequence is determined by performing time-series filtering on a white random frequency series at a probability of generation based on a relation between the intensity of the reflected wave and the oscillation frequency.

10. An RF heating system including multiple radiation units, each radiating an electromagnetic wave for heating at variable frequencies, wherein each said radiation unit comprises:

a variable-frequency oscillator;

a semiconductor power amplifier for amplifying an output of the variable-frequency oscillator;

a radiator for radiating an electromagnetic wave for heating based on an output of the semiconductor power amplifier; and a reflected wave monitoring circuit for detecting a reflected wave of the electromagnetic wave for heating, and wherein the RF heating system further includes a controller for controlling oscillation frequencies of the respective variable-frequency oscillators included in those radiation units, and wherein the controller changes the oscillation frequencies of the respective variable-frequency oscillators discontinuously so that there is no correlation at all between the frequencies of the radiation units, thereby getting a frequency-hopping spread-spectrum radiation done independently of each other by the respective radiators included in those multiple radiation units.

11. The RF heating system of claim 10, wherein the controller determines a probability of generation of the oscillation frequency of the variable-frequency oscillator included in each said radiation unit so that the probability of generation of the oscillation frequency in a frequency range in which an intensity of the reflected wave that has been detected independently by the reflected wave monitoring circuit included in that radiation unit is relatively low is higher than that of the oscillation frequency in a frequency range in which the intensity of the reflected wave is relatively high.

12. A method for driving an RF heating system that includes: a variable-frequency oscillator; a semiconductor power amplifier for amplifying an output of the variable-frequency oscillator; a radiator for radiating an electromagnetic wave for heating based on an output of the semiconductor power amplifier; a reflected wave monitoring circuit for detecting a reflected wave of the electromagnetic wave for heating; and a controller for controlling an oscillation frequency of the variable-frequency oscillator, the method comprising the steps of:

(A) radiating an electromagnetic wave for heating by the radiator while changing the oscillation frequencies of the variable-frequency oscillator discontinuously;

(B) detecting an intensity of a reflected wave of the electromagnetic wave for heating by the reflected wave monitoring circuit and finding a relation between the intensity of the reflected wave and the oscillation frequency; and (C) locating a frequency range in which the reflected wave has a relatively low intensity by reference to a relation between the intensity of the reflected wave and the oscillation frequency that has been found in the previous step (B), wherein the step (A) includes setting a probability of generation of the oscillation frequency in a frequency range in which the reflected wave has a relatively low intensity higher than that of the oscillation frequency in a frequency range in which the reflected wave has a relatively high intensity.

13. The method of claim 12, wherein the step (C) includes determining an oscillation frequency, at which the reflected wave has a lowest intensity, by reference to the relation between the intensity of the reflected wave and the oscillation frequency that has been found in the step (B).

* * * * *